United States Patent Office 3,166,580
Patented Jan. 19, 1965

3,166,580
DICYCLOPENTYLTRITHIOCARBONATE
James W. Stanley, Jr., Phillips, Tex., assignor to Phillips Petroleum Company, a corporation of Delaware
No Drawing. Filed July 15, 1963, Ser. No. 295,603
7 Claims. (Cl. 260—455)

This invention relates to novel trithiocarbonates and a method for their production. In one aspect this invention relates to novel dicyclopentyltrithiocarbonates. In another aspect this invention relates to a process for producing these dicyclopentyltrithiocarbonates. In another aspect this invention relates to the use of dicyclopentyltrithiocarbonates as pesticides.

It is known that there is no universal pesticide. Thus the quest for compounds which will aid man in keeping the various pests, such as mites, insects, nematodes and the like in check in constantly being followed.

I have now discovered, in accordance with this invention, a novel class of compounds which are useful as insecticides. In addition, I have provided a process for producing such compounds.

Accordingly, it is an object of this invention to provide novel dicyclopentyltrithiocarbonates.

Another object of this invention is to provide a process for producing novel dicyclopentyltrithiocarbonates.

A still further object of this invention is to provide novel dicyclopentyltrithiocarbonates which are useful as insecticides.

Other objects, advantages and features of the invention will be apparent to those skilled in the art from the following description and the appended claims.

The compounds of the present invention have the following formula:

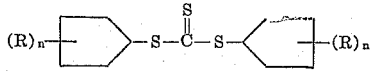

wherein each R is a member selected from the group consisting of hydrogen, alkyls, aryl, cycloalkyl and aralkyl radicals having from 1 to 10 carbon atoms therein, $n$ is an integer of from 1 to 4, and wherein the total carbon atoms in said compound range from 11 to 40.

Such compounds include dicyclopentyltrithiocarbonate, di(3-methylcyclopentyl)trithiocarbonate, di(2-cyanocyclopentyl)trithiocarbonate, di(3-ethylcyclopentyl)trithiocarbonate, di(1-butylcyclopentyl)trithiocarbonate, di(2-tert-butylcyclopentyl)trithiocarbonate, di(3-sec-hexylcyclopentyl)trithiocarbonate, di(benzylcyclopentyl)trithiocarbonate, di(-naphthyl-naphthenylcyclopentyl)trithiocarbonte, di(2 - bromocyclopentyl)trithiocarbonate, di(3-chlorocyclopentyl)trithiocarbonate, di(2-fluorocyclopentyl)trithiocarbonate, di(3-cyanocyclopentyl)trithiocarbonate, cyclopentyl - 2 - bromocyclopentyltrithiocarbonate, 3-(4-ethylphenyl)cyclopentyl - 2 - carboxycyclopentyltrithiocarbonate, 3 - (2-n-butylcyclohexyl)cyclopentyl-3-carbethoxycyclopentyltrithiocarbonate, 2,3,4,5-tetra-n-butylcyclopentyl-2-isobutyl-3-n-decylcyclopentyltrithiocarbonate and the like.

The compounds of the invention are prepared by the process represented by the following equations:

(1) $CS_2 + M_2S \longrightarrow MS-\overset{S}{\underset{\|}{C}}-SM$ (2)
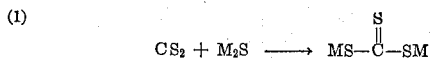

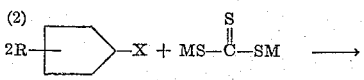

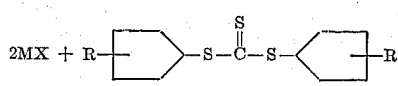

wherein M is an alkali metal selected from the group consisting of sodium, potassium, rubidium and cesium, preferably sodium, X is a halogen, preferably chlorine or bromine, and R is a member selected from the group consisting of hydrogen, atom alkyls, aryl, cycloalkyl and aralkyl radicals having from 1 to 10 carbon atoms therein.

The process is conducted at a temperature within the range of 80° to 200° C. for a period of from 2 to 20 hours, 4 to 10 hours being preferred. The process is preferably conducted at atmospheric pressure, although a pressure within the range of 0 to 20 p.s.i.g. is suitable.

In addition, any chemically inert diluent is suitable for use as the reaction medium. However, water is preferred, present in an amount to retain the resulting metal halide in solution.

The following example will serve further to illustrate the invention.

Example 880 grams (8.7 g. mols) of cyclopentylchloride and 483 grams (3.1 g. mols) of sodium trithiocarbonate formed by the reaction of carbon disulfide and sodium sulfide, and dissolved in the minimum amount of water required to hold the resulting sodium chloride in solution, were combined. The resulting mixture was then refluxed 7 hours. The resulting phases were separated and the following products recovered:

Twenty-seven grams of sodium cyclopentyltrithiocarbonate was recovered by crystallization from the water phase at 74° F.

The organic phase was distilled to give the following products:

| Component | B.P., °C. | Mol Percent Based on Cyclopentyl-Chloride |
|---|---|---|
| Cyclopentylchloride (760 mm.) | 104–115 | 68.5 |
| Cyclopentylsulfide (20 mm.) | 118–124 | 6.8 |
| Dicyclopentyltrithiocarbonate (0.6 mm.) | 150–151 | 21.7 |

The dicyclopentyltrithiocarbonate exhibited the following properties:

| | Observed | Calculated |
|---|---|---|
| Molecular weight | 241 | 246 |
| Total sulfur, wt. percent | 38.9 | 38.9 |
| Density | 49.4 C. 1.135 | |
| Freeze point | 26.8° C | |
| Boiling point (0.6 mm.) | 151° C | |

The dicyclopentyltrithiocarbonate compounds of this invention are useful as contact insecticides, fungicides, and nematocides. In addition, the compounds are useful as lubricating additives and as ore flotation agents.

Various modifications of this invention can be made, or followed, in view of the foregoing disclosure without departing from the spirit or scope thereof.

I claim:
1. Dicyclopentyltrithiocarbonates of the formula

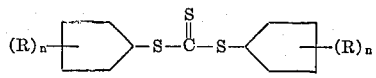

wherein each R is a member selected from the group consisting of hydrogen, alkyl, aryl, cycloalkyl and aralkyl radicals containing from 1 to 10 carbon atoms, $n$ is an integer from 1 to 4, and wherein the total carbon atoms in said compound range from 11 to 40.

2. Dicyclopentyltrithiocarbonate.

3. A process for preparing dicyclopentyltrithiocarbonates of the formula

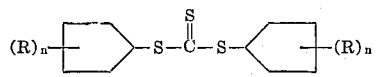

wherein each R is a member selected from the group consisting of hydrogen, alkyl, aryl, cycloalkyl and aralkyl radicals containing from 1 to 10 carbon atoms, $n$ is an integer from 1 to 4, and wherein the total carbon atoms in said compound range from 11 to 40, which comprises the steps of (a) forming an alkali metal trithiocarbonate of the formula

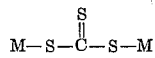

wherein M is an alkali metal by reacting carbon disulfide and an alkali metal sulfide, (b) reacting the resulting alkali metal trithiocarbonate with a cyclopentyl halide of the formula

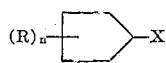

and (c) recovering the resulting dicyclopentyltrithiocarbonte as a product of the process.

4. The process of claim 3 wherein step (b) is conducted in the presence of an inert diluent.

5. The process of claim 4 wherein said inert diluent is water.

6. A process for the preparation of dicyclopentyltrithiocarbonate which comprises the steps of (a) forming sodium trithiocarbonate by reacting carbon disulfide and sodium sulfide, (b) reacting the resulting sodium trithiocarbonate with cyclopentylchloride, and (c) recovering dicyclopentyltrithiocarbonate as a product of the process.

7. A process for the preparation of dicyclopentyltrithiocarbonates of the formula

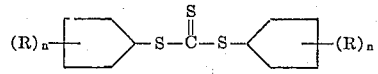

wherein R is a member selected from the group consisting of hydrogen and alkyl, aryl, cycloalkyl and aralkyl radicals containing from 1 to 10 carbon atoms, $n$ is an integer of from 1 to 4, and wherein the total carbon atoms in said compound range from 11 to 40, which comprises (a) reacting an alkali metal sulfide with carbon disulfide, (b) reacting a cyclopentyl halide of the formula

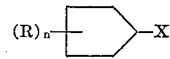

wherein R is as defined and X is a member of the group consisting of bromine, chlorine, fluorine and iodine with the resulting alkali metal trithiocarbonate of the formula

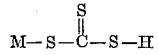

wherein M is an alkali metal at a temperature within the range of 80 to 200° C. and a pressure within the range of 0 to 20 p.s.i.g. for a period of 2 to 20 hours, and (c) subsequently recovering the dicyclopentyltrithiocarbonate as a product of the process.

No references cited.

UNITED STATES PATENT OFFICE
CERTIFICATE OF CORRECTION

Patent No. 3,166,580            January 19, 1965

James W. Stanley, Jr.

It is hereby certified that error appears in the above numbered patent requiring correction and that the said Letters Patent should read as corrected below.

Column 4, lines 24 to 26, the formula should appear as shown below instead of as in the patent:

$$M-S-\overset{\overset{\displaystyle S}{\|}}{C}-S-M$$

Signed and sealed this 27th day of July 1965.

(SEAL)
Attest:

ERNEST W. SWIDER            EDWARD J. BRENNER
Attesting Officer            Commissioner of Patents